(12) United States Patent
Tang

(10) Patent No.: US 6,997,705 B2
(45) Date of Patent: Feb. 14, 2006

(54) ROTATING CHAINS OR RINGS CARRY VERTICALLY HANGING TRAYS FOR HEAT PROCESSES IN A FURNACE

(76) Inventor: Ching Chiang Tang, 914 Bains St., East Palo Alto, CA (US) 94303

( * ) Notice: Subject to any disclaimer, the term of this patent is extended or adjusted under 35 U.S.C. 154(b) by 52 days.

(21) Appl. No.: 10/730,150

(22) Filed: Dec. 7, 2003

(65) Prior Publication Data

US 2005/0145240 A1 Jul. 7, 2005

(51) Int. Cl.
*F27D 3/12* (2006.01)
(52) U.S. Cl. .................. 432/141; 99/427; 126/41 C; 126/21 A
(58) Field of Classification Search ................ 432/121, 432/124, 141, 142; 99/345, 395, 393, 427; 126/41 C, 21 A; 422/307
See application file for complete search history.

(56) References Cited

U.S. PATENT DOCUMENTS

| | | | | |
|---|---|---|---|---|
| 1,399,750 A | * | 12/1921 | Dalton et al. ................. 432/65 |
| 2,032,751 A | * | 3/1936 | Hatch ........................... 432/45 |
| 2,637,283 A | * | 5/1953 | Klein et al. .................. 432/212 |
| 3,074,360 A | * | 1/1963 | Vaughan ...................... 432/141 |
| 4,184,420 A | * | 1/1980 | Podaras et al. ............... 99/427 |
| 5,393,039 A | * | 2/1995 | Smith ......................... 266/261 |
| 5,570,627 A | * | 11/1996 | Dahlstrom et al. ........... 99/427 |
| 5,704,278 A | * | 1/1998 | Cross ........................... 99/427 |
| 6,796,301 B1 | * | 9/2004 | Haas et al. ................ 126/19 R |

* cited by examiner

*Primary Examiner*—Gregory Wilson
(74) *Attorney, Agent, or Firm*—Schein & Cai LLP; Douglas E. Mackenzie

(57) ABSTRACT

A furnace for energy saving and space reduction used in electronic industry assembly, medical sterilization, or food process application is provided. In the furnace there is a number of trays hinged on a pair of continuous chains which movement is in a circle or oval trajectory, or on the rotating beam mechanism constituting as spider web form. A pair of rings is added to restrain the swing movement of each tray via the mechanical linkage during rotation. A dome formed at the top portion inside the furnace is used as an enclosure where the heated inert gas is almost kept. The electric power for heater and blower can be reduced by the natural convection. An opening is located at the lower portion of the furnace; so the operator can do loading and unloading performance.

28 Claims, 6 Drawing Sheets

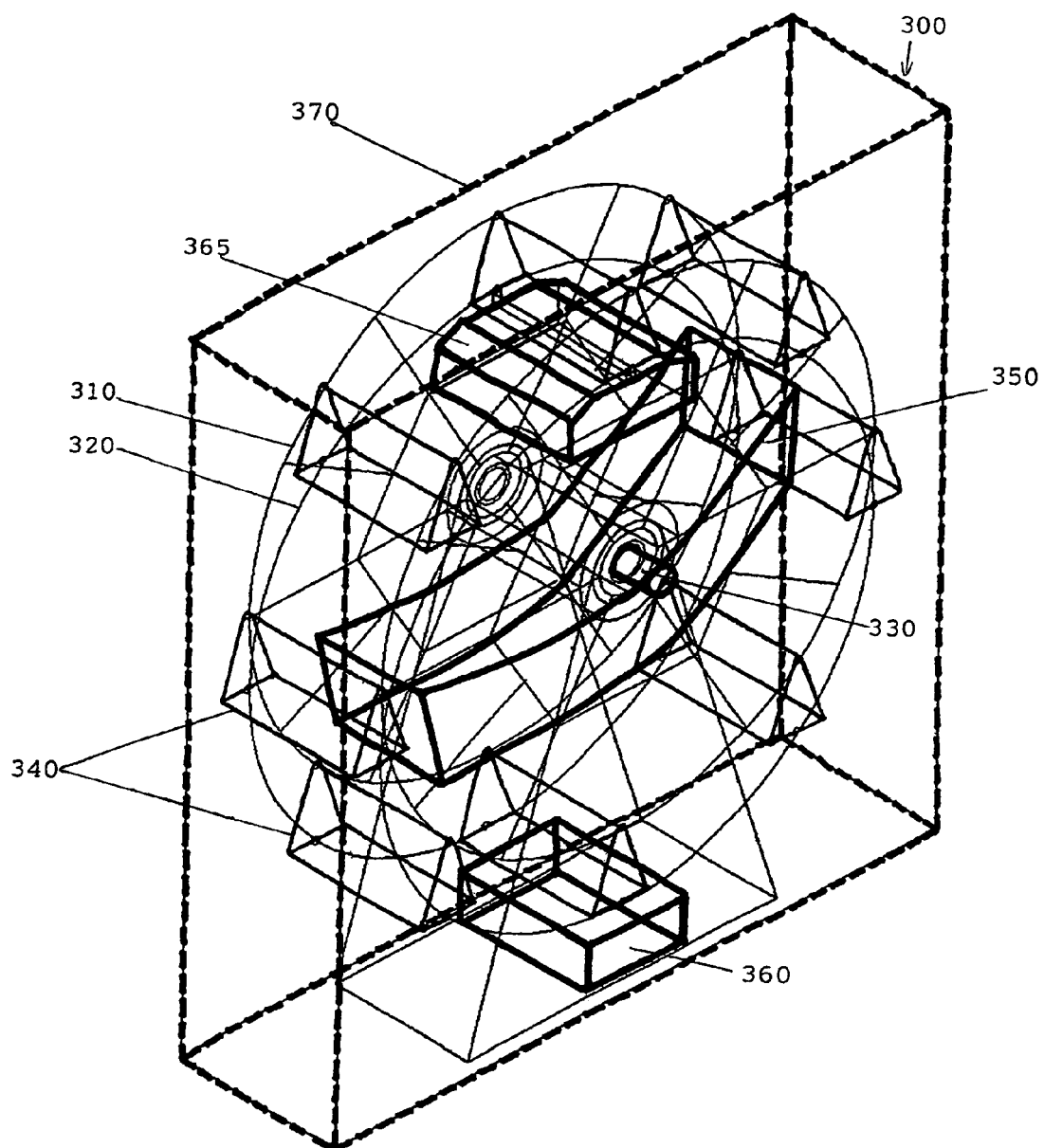
Fig. 3
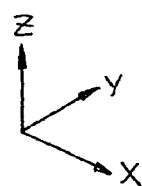

ROTATING CHAINS OR RINGS CARRY VERTICALLY HANGING TRAYS FOR HEAT PROCESSES IN A FURNACE

BACKGROUND OF THE INVENTION

1. Field of the Invention

This invention relates generally to a furnace configuration by arranging the mechanical and electric units to carry out heating-cooling processes for electronic component manufacturing, food process, or medical sterilization applications. More particularly, this invention relates to a new and improved furnace configuration to simplify the processes for manufacturing electronic component, for food processing, or for carrying out medical sterilization applications while reducing wastes of energy and achieving time-saving required for the processes.

2. Description of the Related Art

The conventional furnaces are still limited by the technical difficulties that linear conveyors are often employed to carry the objects through a furnace to perform several cycles of heating and cooling processes through several chambers or zones. Specifically, the conventional furnaces used in the electronic industry for processing and soldering the Printed Circuit Board (PCB) assemblies are constructed by employing linear conveyors. The object to be heated is placed on the conveyer at the inlet of the furnace and the conveyer then carries the object to move linearly through a series of heating chambers with pre-set temperatures. Some chambers are equipped with heaters and fans to carry out the pre-heating or intensive heating operations while the subsequent chambers are installed with fans to follow with a process to cool down the objects according to the process requirements. In the conventional configuration, there are excessive energy wastes due to heat losses caused by the hot air leaks from the multiple openings in heat chambers to accommodate the entry and exit of the linear conveyors. Also energy is wasted due to the inefficiency of heat utilization as the hot air continuously migrates to the top of the heat chamber while the objects for heating processes are passed through the bottom of the heating chambers. Furthermore, in a batch process, when the cooling and heating processes are performed in a single chamber, the heating and cooling cycles often prolong the manufacturing processes because the processing cycles requires minimum lengths of time for the objects to cool down and pre-heat before a next heating cycle may begin. All these limitations add to the cost and manufacture complexities when a conventional furnace is employed.

U.S. Pat. No. 5,154,338 discloses the heating units arrangement with fan in each chamber to be installed opposite one another above and below the conveyor to constitute as a pair along the line and separated by the partial partition so that all the boards can be carried through these chambers from one end (inlet) to the other end (outlet). Therefore, at least two operators are required to carry out the tasks of heating profile adjustment, board loading as well as unloading, and quality inspection. The heat generated at each chamber cannot be easily recovered and used again by other chambers unless a special and more costly heat recycle designs are implemented to improve the energy recycling. Another limitation of the patented invention is the limited amount of reduction that can be accomplished in reducing the inner gas consumption by installing the necessary partitions as disclosed in this patent. Other drawback of the linear type furnace is the limitation that such furnaces are not suitable for application in offices or laboratories due to the volume occupied by the furnace. Due to the required space, installation of a furnace in a medical laboratory or restaurant for food processes is not feasible even that such furnace would be quite convenient and useful for heat treatments. The patented invention does not resolve the difficulties of inefficiency use of energy, as the main door of the oven has to be opened for each loading-unloading cycle. Consequently, the heat applied in the previous batch operation is lost, so does the inert gas pumped into the chambers of the furnace. The oven has to be heated again for each cycle for a period of time, so does the inert gas too.

For these reasons, there is a need for providing new and improved furnace configurations and techniques of using the furnace for simpler, faster, more energy efficient and more economical methods to carry out heating processes as that required in many different applications. It is desirable that a person of ordinary skill in the art is enabled to design a furnace that is smaller more convenient to operate, more energy efficient, and can be easily adapted into different kinds of operation environments for broader applications.

SUMMARY OF THE PRESENT INVENTION

It is therefore an object of the present invention to provide a new and improved furnace configuration to simplify the loading/unloading procedures, to minimize the heat losses and to reduce the inert gas consumption such that the above-mentioned limitations and difficulties of the conventional furnace can be resolved.

Specifically, it is an object of the present invention to provide a furnace enclosed in a furnace housing to enable a substantially vertical rotational movement of objects within the furnace housing to carry out different kinds of heat processes and cooling processes in a single processing cycle. Special mechanical designs are implemented to assure the objects for heating are maintained at a fixed orientation without slipping or position shifts. The losses of heat applied for performing the heat processes are significantly reduced because the loading and unloading processes can be carried out only once at the same location. Efficient utilization of energy is enhanced, as the heating zone is located on the top portions of the furnace where the hot air generated by the properly arranged heater around the rotating cycle path migrates through natural convention to the top of the chamber with few electric fans. This invention thus takes advantage of the natural convection to reduce the energy consumption compared to the conventional furnace applying more electric fans as means of force convention.

In a vertical rotating system as now disclosed in this invention, one person is enabled to carry out both the loading-unloading operations and temperature profile adjustment all at one location. Additional benefit is realized because the heat generated by lower section in the oven is available at other portions of the furnace at a higher level within the furnace by its own natural convection or partial force convection to further enhance the effectiveness of the heating processes.

Briefly, in a preferred embodiment, the present invention discloses a hybrid furnace for heating operation used by electronic industry, medical sterilization, or food process application. The furnace includes an enclosure containing two parts of rings, or one pair of rings and one pair of chains which are riding on another pair of rings; one pair of rings is fixed and is placed at the lower portion of the whole furnace structure, the other pair of rings or pair of chains which are riding on another pair of rings is rotating around of its own geometrical center and is placed at the top portion of the furnace. The above said ring has different shape such as circle, ellipse, or irregular. Only the circle or ellipse shape is presented and described to provide maximum flexibility for invention at here. The developed concept and the associated design is also applied to the irregular shape process application. As to the rotation movement, all above said rings are fixed except the two pairs of circle rings. In two pairs of circle rings, the top pair of rings is allowed to rotate around its geometrical center and carry the trays. Other types of ring shape rotate the trays via the chain movement. For the purpose of this invention, it is optional to use stationary ring pair. Under the circumstances when the objects loaded on the tray are heavy enough to provide the hinge bearing sufficient friction, or alternatively, in a situation where the swing of the tray during rotation or swung by external forces would not adversely affect the purposes of operations using the furnace then the stationary ring can be removed.

In summary, this invention discloses a method for carrying out a heating-cooling process in a vertically rotating furnace. The method includes a step of employing a vertically rotational mechanism for carrying an object for heating to perform a cooling process at a lower portion of the furnace and to carry out a heating process at a top portion of the furnace. In a preferred embodiment, the method further includes a step of using a fixed ring to stabilize the vertically rotational mechanism to avoid the impact caused by jerk movement. In another preferred embodiment, the vertical rotational mechanism includes a plurality of segments of guide-strips for guiding a rotational movement of the vertically rotational mechanism.

These and other objects and advantages of the present invention will no doubt become obvious to those of ordinary skill in the art after having read the following detailed description of the preferred embodiment that is illustrated in the various drawing figures.

BRIEF DESCRIPTION OF THE DRAWINGS

FIG. 3 shows a perspective view of a furnace of this invention implemented with one pairs of rotating rings and one pair of fixed rings;

DETAILED DESCRIPTION OF THE PREFERRED EMBODIMENT

Figure 1:
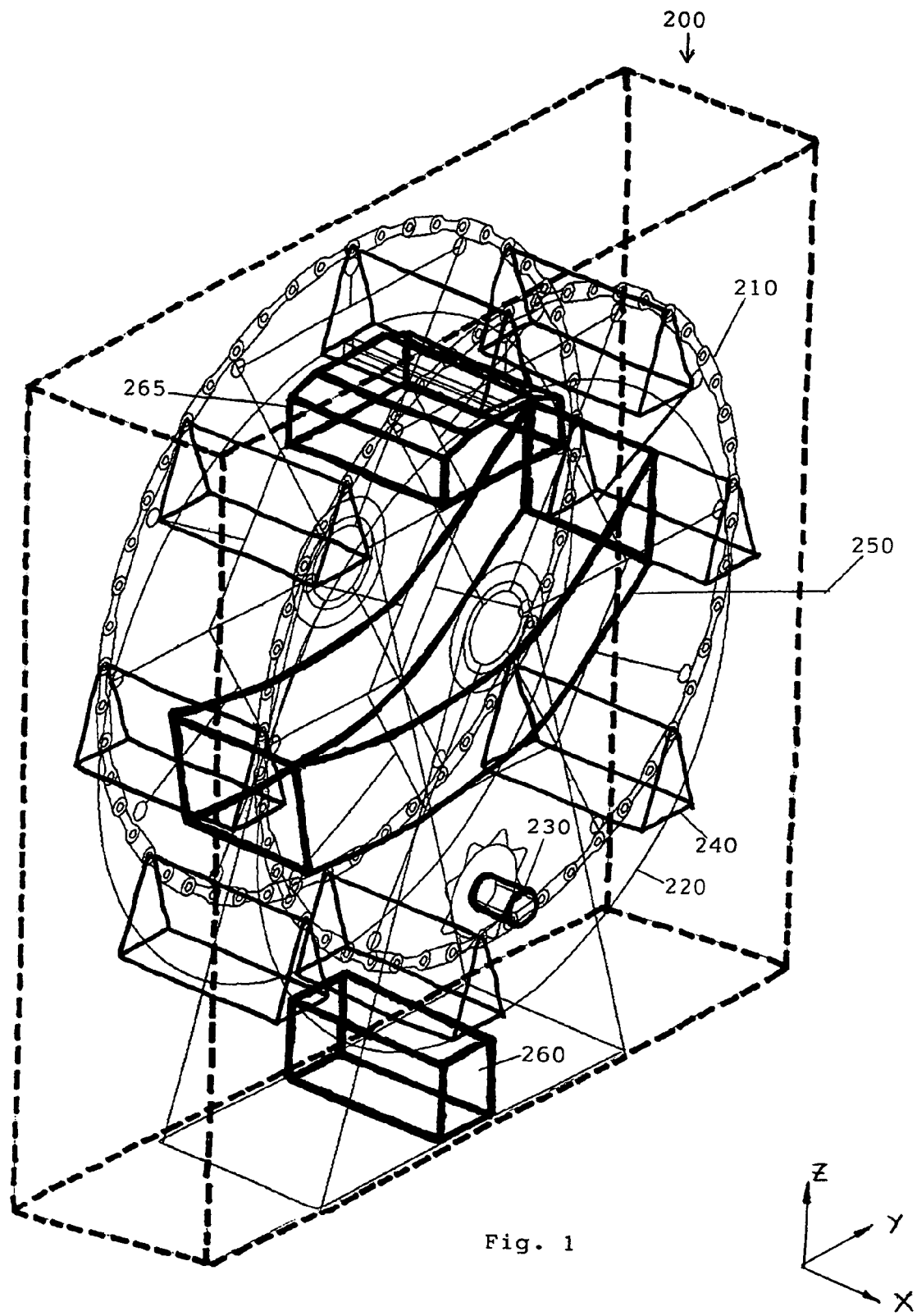
FIG. 1 shows a perspective view of a furnace of this invention implemented with one pairs of rotating chains and one pair of fixed rings.
Figure 2:
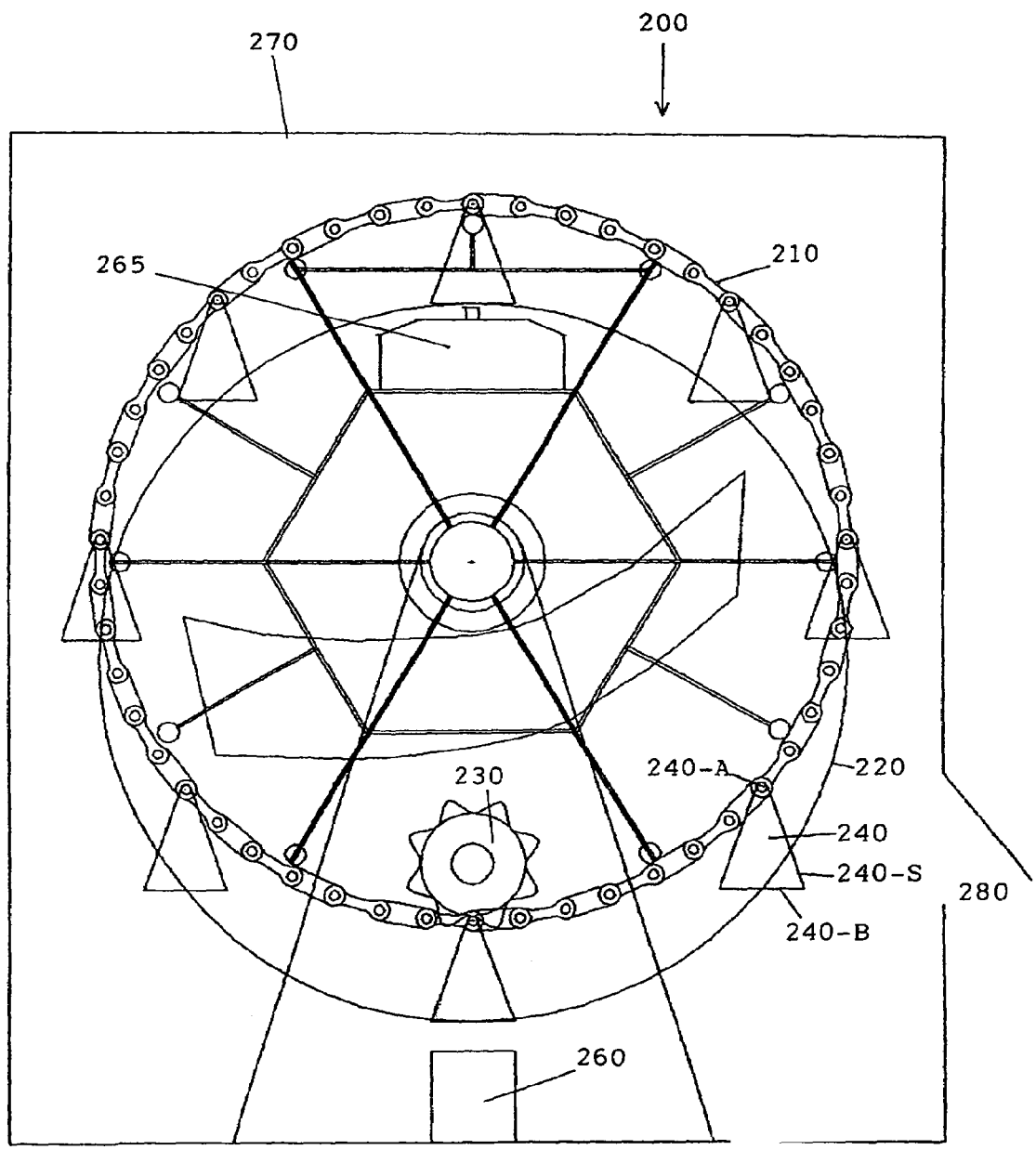
FIG. 2 shows a front view of the furnace of FIG. 1 according to this invention.

Referring to FIGS. 1 and 2 respectively for a perspective view and a front view of a furnace 200 of this invention. The furnace includes a pair of chains 210 and a pair of rings 220 disposed immediately below the pair of chains 210. A motor 230 with gearbox is engaged to one chain or both chains to drive the pair of chains to rotate while the pairs of rings 220 are kept stationary. A plurality of trays 240 that includes a horizontal bottom plate 240-B and side panels 240-S with top apex 240-A having two hanging points attached and hung on the chains 210. The bottom plate 240-B is engaged and restrained along the pair ring 220 to assure that the horizontal bottom plate is continuously maintained at a horizontal plane as the pairs of chains 210 carry the trays 240 along a rotational trajectory. The trays 240 are engaged between the pairs of rotational chains 210 and the stationary rings 220 employing a "four bar linkage" mechanism such that the bottom plate 240-B can always orient along a horizontal plane to carry the objects to undergo the thermal cycles of heating up and cooling down processes. Special arrangements are made between the chain 210 to ring 220 on each side with an offset at a defined space so a drive bar can be used to connect with both units without any interference during cycle rotation. The furnace 200 further includes a heat exchanger 250 for controlling the temperature of the furnace. A flux foam pot 260 is disposed on the bottom for carrying out flux coating on the bottom side of PC board. A wave-soldering unit 265 is placed on the top portion of the furnace.

Referring to FIG. 2, the furnace is enclosed in a semi-enclosure housing 270 as that shown in FIG. 2 with a loading/unloading opening 280 for loading the objects for heating/cooling onto the trays 240 and to remove the objects for heating after the heating/cooling processes are completed. The rotating mechanism as that implemented by the motor 230 and the pair of chains 210 rotates the objects for heating placed onto the trays 240 from a cold zone disposed at the fourth quadrant range, i.e., at a lower portion at the enclosure housing 270 of the furnace to the hot zone disposed on the top portion of the enclosing housing 270 for carrying out the heat processes on the objects for heating. The motor 230 can be controlled to rotate the objects between the cold zone and the hot zone alternatively to do soldering reflow and wave soldering in hot zone and solidifying the solder material between the leads/pins and the pads/holes of the electronic parts stuffed on the printed circuit board in the cold zone.

Figure 5:
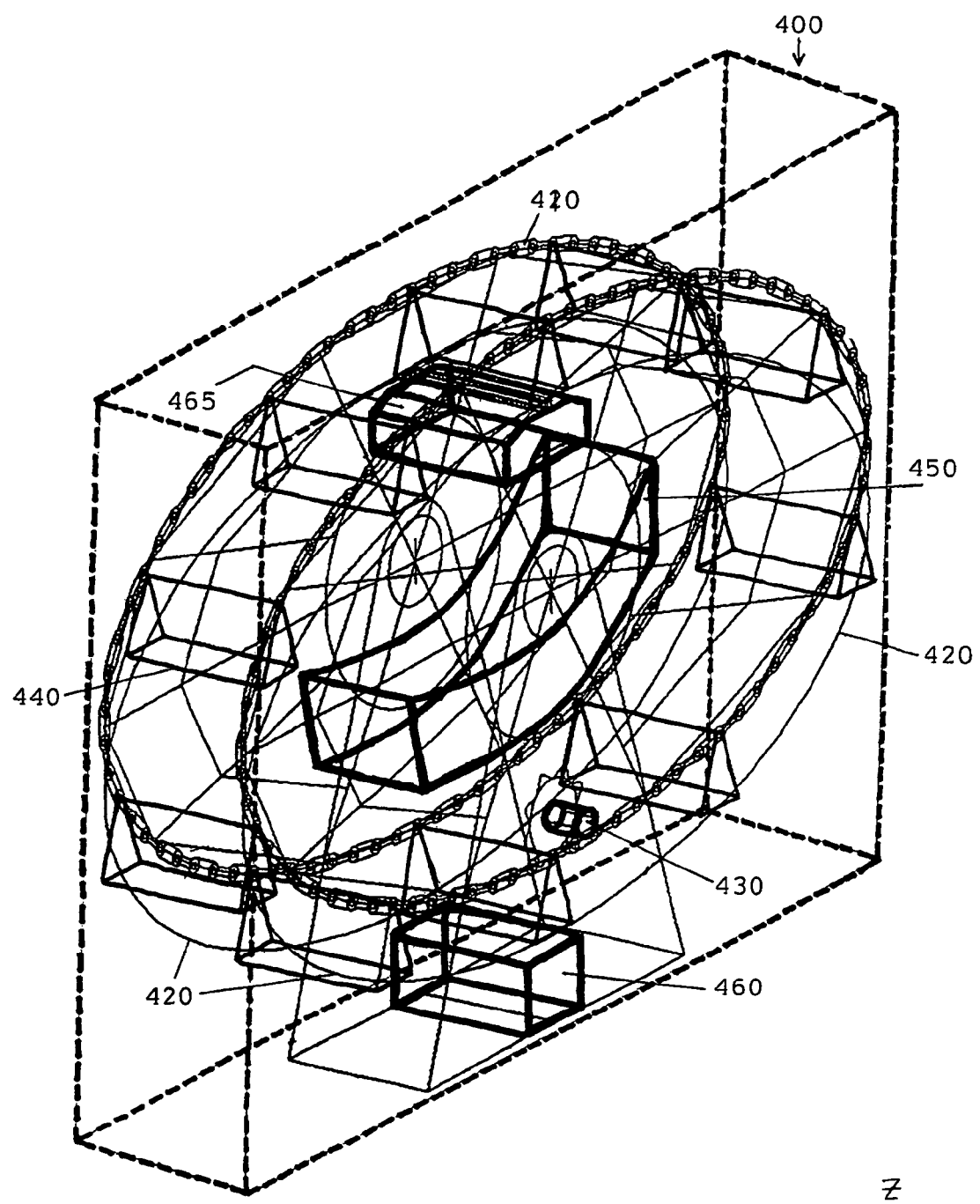
FIG. 5 shows a perspective view of a furnace of this invention implemented with one pairs of rotating ellipse-shaped chains and one pair of fixed ellipse-shaped rings.

In FIGS. 1, 3, & 5 above, the heavy continuous lines represents special function modules; soldering pot, flux foam generator, and heat exchanger. The heavy dashed lines represent the house of the furnace. The sub-heavy continuous lines represent the trays. The fine continuous lines represents the skeleton structure of the furnace including the above said rings and chains. The heating units are not put on the drawings due to each customer has his own temperature profile for different specific applications. Another reason is to make drawings more simple and clear without the heaters added on.

This invention thus discloses a semi-enclosure furnace to perform both heating-up process and cool down operation in a single processing cycle carried out at different locations with simple partition inside a confined rotating volume within the enclosure housing 270. The simple virtual partition is constituted by the natural convection, enhanced by the tray movement acting as propeller. In the meantime, fewer heating units are imposed around the tray movement path so the furnace temperature profile can be set such as infinitesimal heating change or rapid increment. On the opposite side of cooling in furnace first quadrant, the installation of heat circulation unit diverts the unnecessary heat from the furnace first quadrant to the third quadrant for preheat purpose. This makes the cooling process easier at the first quadrant. In a preferred embodiment, the furnace is provided with a plurality of radiatively elongated beams with one end connected to a small circle which is attached to the furnace and the other end, generally referred to as an external point, is restrained by a large concentric circle ring which allows the chains 210 to ride on. These external points are also restrained by a cross bar installed between two nearby beams. The final shape of the ring is likely a spider web form. So the chain 210 is rotating along the top ring pair, which are as the skeleton to support the chain rotation and also make a contribution of the rigid structure of the furnace. The work pieces or printed circuit board are loaded on the trays. The tray, e.g., beams disposed between the pair of chains 210, has an apex 240A hinged on the rotating chain 210 on the top ring pair and the base is connected to the lower ring pair that is attached to the furnace via the sliding mechanism. This invented linkage can provide a stable and steady rotating movement of the tray by restraining at the middle point of the lateral sides of the base 240B. Therefore, the tray is rotating in the hot zone and the cool zone, alternatively, in the vertical three dimension space with the pivot at the geometrical center of the rotating chain pair. For the printed circuit board assembly processes in the electronic industry to solder the electronic components onto the printed circuit board, the performance of both the soldering reflow and wave soldering can now be carried out in a single processing cycle as the tray is rotating in the hot zone and the solder solidification takes place as the tray is rotated to the cool zone, respectively.

Another benefit of this invention is the smooth operations of the loading and unloading of the objects onto the trays because the rotational movements of the trays. Special mechanisms for automatically loading and unloading may be conveniently designed to comply with the rotational movements of the trays to place and remove the objects for heating to and from the trays through the exit 280 or it can be opened at the convenient location for equipment operator. The trays now smoothly enter into the dome developed by the revolution of both rotational ring pair and the movement of the trays. The furnace develops a temperature gradient along the elevation of the furnace and increases the heating effect by adding heating units along the tray movement path at the intended zone area. Consequently, The heat can be easily kept in the upper dome and the consumption can be significantly reduced, so does the inert gas. For PCB soldering processes, by employing a furnace disclosed in this invention, the drag material used for the wave-soldering oven can be reduced to a minimum level or even diminished to a level of zero usage when proper designs are implemented with inert gas or reduced atmosphere.

One more benefit is the system can be applied to other kinds of applications by simply adding required devices or equipment or modules to this vertical rotating system. The system construction characteristics with its compact size and ease of operation, the furnace can be easily and conveniently built for operation in an office or small laboratory. The furnace of this invention can therefore be employed for applications such as medical, food processing, or any industrial procedures that require heat processing.

Figure 4:
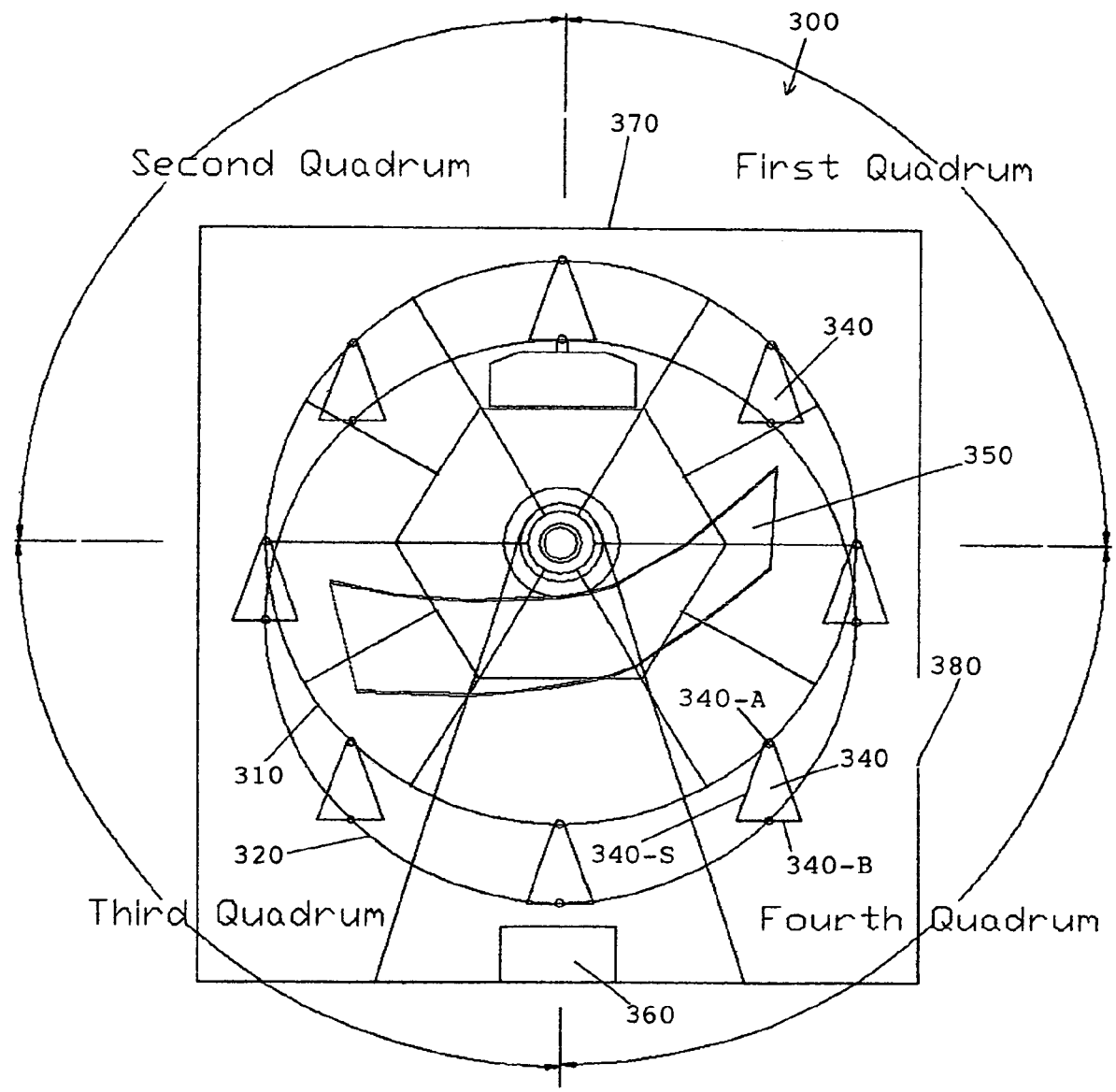
FIG. 4 shows a front view of the furnace of FIG. 3 according to this invention.

FIGS. 3 and 4 are a perspective view and a front view of another preferred embodiment of a furnace 300 disclosed in this invention wherein a furnace is implemented with vertically rotating rings 310 and a fixed ring 320. This pair of vertically rotating rings 310 is driven by a motor 330 for carrying the trays 340 to rotate inside a furnace housing enclosing the pair of vertically rotating rings. As shown in FIGS. 3 and 4, this pair of fixed rings 320 separated by a desired distance provides open space inside the furnace to accommodate the pair of rotating rings 310 whose central portion is attached to rotary driver mechanism powered by motor 330. Furthermore, the axis line constituted by two fixed ring geometric center are parallel and vertically below the axis line constituted by two rotating ring geometric center. The pair of fixed rings 320 keeps the trays 340 in a vertical position as that clearly shown in FIG. 4 when the trays are rotated from the first quadrant through the second, third and fourth quadrants then returns to the first quadrant. Alternately, the trays may also be rotated along a clockwise direction through the fourth, third, second and return to the original position. A motor 330 with a gearbox is engaged to one ring or both rings to drive the pair of rings 310 to rotate while the pairs of rings 320 are kept stationary. A plurality of trays 340 include a horizontal bottom plate 340-B and side panels 340-S with top apex 340-A having two hanging points attached and hung on the rings 310. The bottom plate 340-B is engaged and restrained along the pair ring 320 to assure that the horizontal bottom plate is continuously maintained at a horizontal plane as the pairs of rings 310 carry the trays 340 along a rotational trajectory. The trays 340 are engaged between the pairs of rotational rings 310 and the stationary rings 320 employing a "four bar linkage" mechanism such that the bottom plate 340-B can always orient along a horizontal plane to carry the objects to undergo the thermal cycles of heating up and cooling down processes. Special arrangements are made between the rings 310 to rings 320 on each side with an offset at a defined space so a drive bar can be used to connect with both units without any interference during cycle rotation. The furnace 300 further includes a heat exchanger 350 for controlling the temperature of the furnace. A flux foam pot 360 is disposed on the bottom for carrying out flux coating on the bottom side of a PC board. A wave-soldering unit 365 is placed on the top portion of the furnace.

Figure 6:
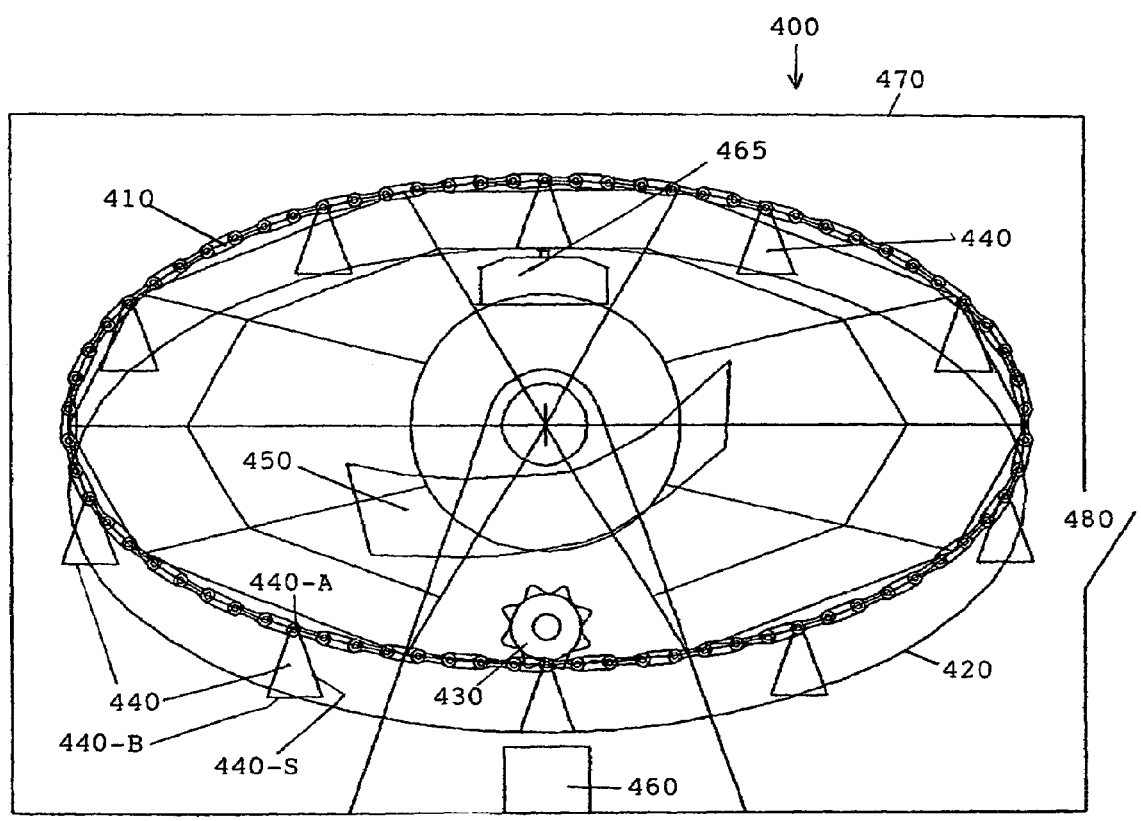
FIG. 6 shows a front view of the furnace of FIG. 5 according to this invention.

FIGS. 5 and 6 are perspective view and a front view of another preferred embodiment of a furnace 400 disclosed in this invention wherein a furnace is implemented with a vertically rotating chains 410 and a pair of fixed ellipse rings 420. This pair of vertically rotating ellipse-shaped chains 410 is driven by a motor 430 for carrying the trays 440 to rotate inside a furnace housing 470 enclosing the pair of vertically rotating chains and fixed ellipse rings 420. As shown in FIGS. 5 and 6, the pair of rotating chains carry the trays 440 while the bottom portions of the trays are sliding along the fixed ellipse rings 420 thus keeping the trays 440 to always maintain a vertical orientation when these trays 440 are rotated with the pair of chains 410 along the vertically ellipse-shaped trajectory as that shown in FIG. 6. A motor 430 with gearbox is engaged to one chain or both chains to drive the pair of chains to rotate while the pairs of rings 420 are kept stationary. A plurality of trays 440 that includes a horizontal bottom plate 440-B and side panels 440-S with top apex 440-A having two hanging points attached and hung on the chains 410. The bottom plate 440-B is engaged and sliding along the pair ring 420 to assure that the horizontal bottom plate is continuously maintained at a horizontal plane as the pair of chains 410 carry the trays 440 along a ellipse-shaped movement. The trays 440 are engaged between the pairs of rotational chains 410 and the stationary rings 420 employing a "four bar linkage" mechanism such that the bottom plate 440-B can always orient along a horizontal plane to carry the objects to undergo the thermal cycles of heating up and cooling down processes. Special arrangements are made between the chains 410 to rings 420 on each side with an offset at a defined space so a "four bar linkage" mechanism can be used to connect with both units without any interference during cycle rotation. The furnace 400 further includes a heat exchanger 450 for controlling the temperature of the furnace. A flux foam pot 460 is disposed on the bottom for carrying out flux coating on the bottom side of PC board. A wave-soldering unit 465 is placed on the top portion of the furnace.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A furnace comprising:
   a housing forming an enclosure;
   a heating means for heating the enclosure;
   an opening formed in the housing; and
   a vertical rotating means disposed in the enclosure, wherein the vertical rotating means comprise a pair of rotating chains carrying a plurality of trays at respective tray apexes and a pair of fixed rings carrying the plurality of trays at respective tray bases.

2. The furnace as claimed in claim 1, wherein the pair of rotating chains and the pair of fixed rings have geometric centers vertically offset from each other.

3. The furnace as claimed in claim 1, wherein the plurality of trays are attached to the pair of rotating chains and the pair of fixed rings by a four bar linkage.

4. The furnace as claimed in claim 1, wherein the plurality of trays are alternatively accessible through the opening.

5. The furnace as claimed in claim 1, wherein the pair of rotating chains are disposed in a top portion of the enclosure and the pair of fixed rings are disposed in the bottom portion of the enclosure.

6. The furnace as claimed in claim 1, wherein the pair of rotating chains and the pair of fixed rings are circular.

7. The furnace as claimed in claim 1, wherein the pair of rotating chains and the pair of fixed rings are elliptical.

8. The furnace as claimed in claim 1, wherein the pair of rotating chains and the pair of fixed rings have an irregular shape.

9. The furnace as claimed in claim 1, wherein the tray bases are maintained in a horizontal orientation by the pair of fixed rings.

10. The furnace as claimed in claim 1, wherein the vertical rotating means comprises a motor.

11. The furnace as claimed in claim 1, further comprising a heat exchanger.

12. The furnace as claimed in claim 1, further comprising a flux pot.

13. The furnace as claimed in claim 1, further comprising a wave soldering unit.

14. The furnace as claimed in claim 1, wherein the vertical rotating means comprise a pair of rotating rings carrying a plurality of trays at respective tray apexes and a pair of fixed rings carrying the plurality of trays at respective tray bases.

15. The furnace as claimed in claim 14, wherein the pair of rotating rings and the pair of fixed rings have geometric centers vertically offset from each other.

16. The furnace as claimed in claim 14, wherein the plurality of trays are attached to the pair of rotating rings and the pair of fixed rings by a four bar linkage.

17. The furnace as claimed in claim 14, wherein the pair of rotating rings are disposed in a top portion of the enclosure and the pair of fixed rings are disposed in the bottom portion of the enclosure.

18. A furnace comprising:
    a housing forming an enclosure;
    an opening formed in the housing; and
    a pair of rotating chains carrying a plurality of trays at respective tray apexes and a pair of fixed rings carrying the plurality of trays at respective tray bases, the pair of rotating chains and the pair of fixed rings being disposed in the enclosure.

19. The furnace as claimed in claim 18, wherein the fixed rings comprise a web-type frame.

20. The furnace as claimed in claim 18, further comprising a heating means for heating the enclosure.

21. The furnace as claimed in claim 18, further comprising a flux pot.

22. The furnace as claimed in claim 18, further comprising a wave soldering unit.

23. A furnace comprising:
    a housing forming an enclosure;
    an opening formed in the housing; and
    a pair of rotating rings carrying a plurality of trays at respective tray apexes and a pair of fixed rings carrying the plurality of trays at respective tray bases, the pair of rotating rings and the pair of fixed rings being disposed in the enclosure.

24. The furnace as claimed in claim 23, wherein the fixed rings comprise a web-type frame.

25. The furnace as claimed in claim 23, further comprising a heating means for heating the enclosure.

26. The furnace as claimed in claim 23, further comprising a flux pot.

27. The furnace as claimed in claim 23, further comprising a wave soldering unit.

28. A method of carrying out a processing step on an item to be processed comprising the steps of:
    providing a furnace having a housing forming an enclosure, an opening formed in the housing, a heating means for heating the enclosure, and a vertical rotating means disposed in the enclosure, the vertical rotating means comprising a pair of rotating chains carrying a plurality of trays at respective tray apexes and a pair of fixed rings carrying the plurality of trays at respective tray bases; and
    rotating the item to be processed within the enclosure.

* * * * *